United States Patent [19]
Lürkens et al.

[11] Patent Number: 5,763,975
[45] Date of Patent: Jun. 9, 1998

[54] AXIAL-FLOW INDUCTION MOTOR

[75] Inventors: Peter Lürkens; Dieter Gerling, both of Aachen, Germany

[73] Assignee: U.S. Philips Corporation, New York, N.Y.

[21] Appl. No.: 744,799

[22] Filed: Nov. 6, 1996

[30]  Foreign Application Priority Data

Nov. 9, 1995 [DE] Germany ............... 195 41 737.2

[51] Int. Cl.$^6$ .................. H02K 17/00; H02K 1/22
[52] U.S. Cl. ................. 310/166; 310/268; 310/51
[58] Field of Search ..................... 310/166, 168, 310/268, 51

[56]  References Cited

U.S. PATENT DOCUMENTS

| | | |
|---|---|---|
| 4,409,506 | 10/1983 | Ito et al. ................ 310/166 |
| 4,777,396 | 10/1988 | Ito et al. ................ 310/166 |
| 5,288,216 | 2/1994 | Bolte ..................... 310/62 |

FOREIGN PATENT DOCUMENTS

| | | |
|---|---|---|
| 0265868A2 | 5/1988 | European Pat. Off. . |
| 0487141A2 | 5/1992 | European Pat. Off. . |
| 0635642A2 | 1/1995 | European Pat. Off. . |

Primary Examiner—Clayton E. LaBalle
Attorney, Agent, or Firm—Edward Blocker

[57]  ABSTRACT

The invention relates to an axial-flow induction motor comprising a stator having a winding arranged in a slot and a rotably supported laminated rotor which is spaced from the stator by an air gap. The rotor has a magnetically highly conductive layer on the side which is remote from the stator and an electrically highly conductive layer on the side which faces the stator. In order to reduce losses caused by harmonics, the rotor also includes an additional magnetic conductive layer between the electrically highly conductive layer and the air gap. The magnetic conductivity of the additional magnetic conductive layer in the direction of rotation is low in comparison with the magnetic conductivity of the magnetically highly conductive layer. The electrically highly conductive layer is also thicker than the magnetically conductive layer.

12 Claims, 3 Drawing Sheets

AXIAL-FLOW INDUCTION MOTOR

BACKGROUND OF THE INVENTION

The invention relates to an axial-flow induction motor comprising a stator having a winding arranged in a slot and comprising a rotatably supported laminated rotor, which is spaced from the stator by an air gap and which has a magnetically highly conductive layer on the side which is remote from the stator and an electrically highly conductive layer on the side which faces the stator.

Such an axial-flow induction motor is known from, for example, EP 0 487 141 A2. This known motor forms part of a fan unit for the generation of gas streams, particularly for vacuum cleaners, and has an impeller wheel which is also electromagnetically active and which in conjunction with electromagnetically active parts of the motor stator produces the torque of the impeller wheel. The electromagnetically active part of the impeller wheel is an electrically highly conductive disc which is disposed in the radial plane and which bounds the air gap at the rotor side. At the stator side the air gap is bounded to an end face of an iron sleeve by planar stator poles with coils arranged in slots. The electrically highly conductive disc of the rotor (e.g. made of aluminum) can, for example, serve as a base of the impeller wheel which at the surface remote from the air gap is backed by a disc of a high-permeability material, (i.e. a material having a high magnetic conductivity, for example, solid iron).

Induction motors of the type defined in the opening paragraph having laminated rotors advantageously are of a particularly simple construction. With these motors the electrical winding generates an alternating magnetic field in the motor. Particularly in the case of multi-phase motors this alternating field is a rotary field, (i.e. the maximum of the magnetic field strength rotates in the desired direction of rotation of the rotor at the radial surface of the stator). This field produces eddy currents in the rotor, which together with the magnetic field drive the rotor in the direction of rotation of the field.

SUMMARY OF THE INVENTION

It is an object of the invention to improve the efficiency of an induction motor of the type defined in the opening paragraph. This object is achieved in that on the side of the rotor which faces the stator, the rotor includes an electrically highly conductive layer has been provided at least partly with an additional magnetically conductive layer. The magnetic conductivity of this additional layer direction of rotation is low in comparison with the magnetic conductivity of a magnetically highly conductive layer of the rotor which is remote from the stator and which is thin in comparison with the thickness of the electrically highly conductive layer. The permeability of the additional layer in the direction of rotation and its thickness in the axial direction have been adapted to one another so as to reduce eddy currents produced in the rotor by harmonics of the stator and the consequential rotational losses resulting in an increased efficiency of the motor. The effective magnetic conductivity of the additional layer is indicative of the magnitude of the average magnetic field strength in this layer in dependence upon the magnetic excitation. The magnetic conductivity of the additional layer in the circumferential direction should then be such that this layer is not saturated in operation.

The essence of the invention is that the electrically highly conductive layer adjacent the stator interacts with the magnetically conductive additional layer provided on the first-mentioned layer in such a manner that the adverse effect of the field harmonics is substantially eliminated. Therefore, the thickness of the magnetically conductive additional layer can be substantially smaller than the penetration depth of the harmonics. Moreover, this construction does not require a given electrical conductivity of the additional layer and it is even possible to use an electrically non-conductive material, for example an ink. Conversely, the small thickness also enables the use of electrodeposited layers, which normally have a high electrical conductivity.

In an embodiment of the invention there has been provided, for example, an all-over additional layer whose material has the desired comparatively low magnetic conductivity.

A further embodiment of the invention is characterized by an additional layer having radial interruptions or an additional layer having radial and concentric interruptions. In these embodiments the starting material for the additional layer can have a comparatively high magnetic conductivity, which can then be reduced to the desired magnetic conductivity by means of said interruptions.

In a further embodiment, the low magnetic conductivity of the additional layer can be obtained by embedding corpuscles of a magnetically conductive material in a magnetically non-conductive matrix.

In a further embodiment of the invention that the additional layer is formed by electrodeposition, or the additional layer is formed by printing with a magnetically conductive and electrically non-conductive ink. This makes it possible to deposit very thin layers.

Which of the various possibilities is selected depends on each specific case.

An embodiment of the induction motor according to the invention is characterized in that the magnetic conductivity of the additional magnetically conductive layer in the rotational direction corresponds to a relative permeability between 2 and 100. The optimum value will depend on the actual design of the stator and can be obtained by experiment.

An embodiment of the induction motor according to the invention is characterized in that the additional magnetically conductive layer has a thickness smaller than 500 μm. If the thickness of the additional magnetically conductive layer becomes too large, the efficiency of the motor is adversely affected. Therefore this thickness is preferably less than 500 μm.

The invention also relates to a fan unit and a vacuum cleaner incorporating the induction motor according to the invention. The induction motor according to the invention is very suitable for these applications because it can be operated at high speed so that a good performance can be obtained with a relatively small and light motor.

BRIEF DESCRIPTION OF THE DRAWINGS

For a fuller understanding of the invention, reference is had to the following description taken in connection with the accompanying drawings, in which.

DETAILED DESCRIPTION OF THE PREFERRED EMBODIMENT

Figure 1:
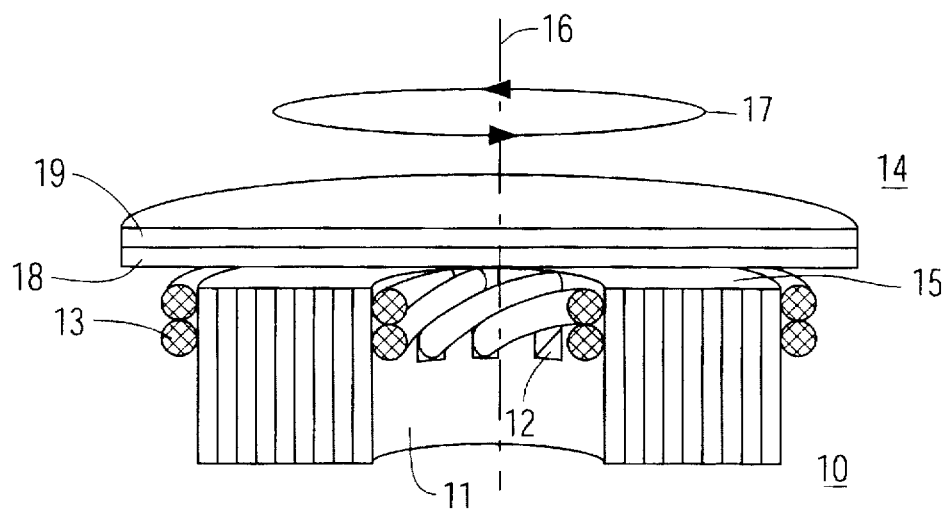
FIG. 1 is a perspective sectional view of a known axial-flow induction motor.

FIG. 1 is a perspective sectional view of an induction motor 30 constructed as an axial-flow motor and comprising a stationary stator 10 having an iron core 11 and a single-phase or a multi-phase electrical winding 13 arranged in a slot 12. A laminated rotor 14 is spaced from the stator 10 by an air gap 15 and is rotatably supported on a shaft 16. A possible direction of rotation is indicated by 17. The rotor 14 has an electrically highly conductive layer 18, which faces the stator 10 and is made of for example aluminum, and a magnetically highly conductive layer 19, which is remote from the stator and which is made of for example magnetic iron. The magnetically highly conductive layer 19, also referred to as rotor yoke, can be either a solid layer or it can be laminated or assembled from a plurality of parts.

Figure 2:
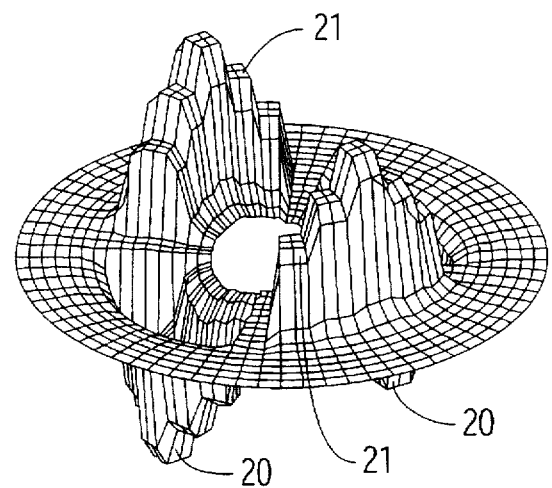
FIG. 2 shows diagrammatically the generated magnetic field.

The electrical winding 13 generates an alternating magnetic field in the induction motor. Particularly in the case of multi-phase motors this alternating field is a rotary field, i.e. the maximum of the magnetic field strength rotates in the desired direction of rotation of the rotor 14 at the radial surface of the stator. This field produces eddy currents in the rotor 14, i.e. in the electrically highly conductive layer 18, which together with the magnetic field drive the rotor 14 in the direction of rotation 17 of the field. The slot 12 of the stator 10 produces distinct steps 20, 21, as shown diagrammatically and in perspective in FIG. 2. The steps indicate that this field contains harmonics. A disadvantage is that in a laminated rotor all harmonics of the stator field also give rise to eddy currents, but these currents brake the rotor and thus produce losses.

Figure 3:
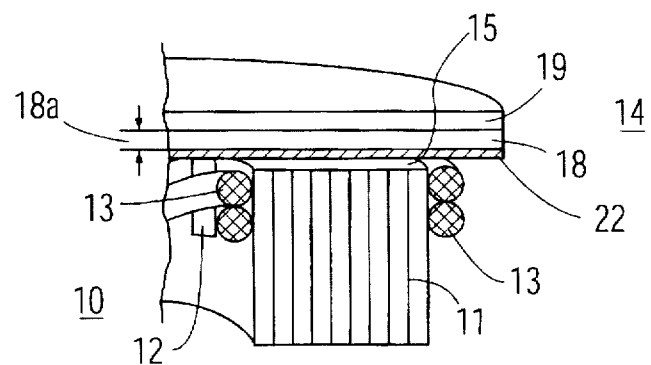
FIG. 3 is a perspective sectional view showing part of an axial-flow induction motor in accordance with the invention.

FIG. 3 shows an embodiment of the invention, which basically corresponds to the motor shown in FIG. 1 but which on the side which faces the electrically highly conductive layer 18 has been provided with an additional magnetically conductive layer 22. It is to be noted that like parts in FIGS. 1 and 3 bear the same reference numerals. Said layer 18 of a thickness 18a interacts with the magnetically conductive additional layer 22 to eliminate or reduce the adverse effect of the field harmonics. The thickness of the additional layer 22 is for example 200 μm and is substantially smaller than that of the electrically highly conductive layer 18. Its relative permeability is for example 50 so that it is substantially smaller than the penetration depth of the harmonics. The additional layer can be formed by electrodeposition or by a magnetically conductive and electrically nonconductive ink.

Figure 4:
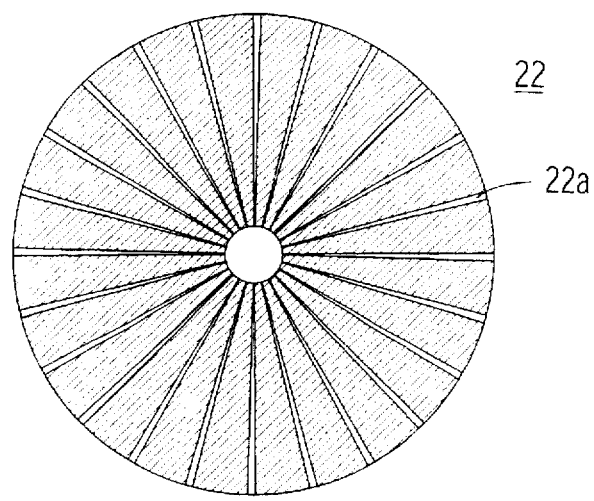
FIGS. 4, 5 and 6 show different examples of a magnetically conductive additional layer.
Figure 5:
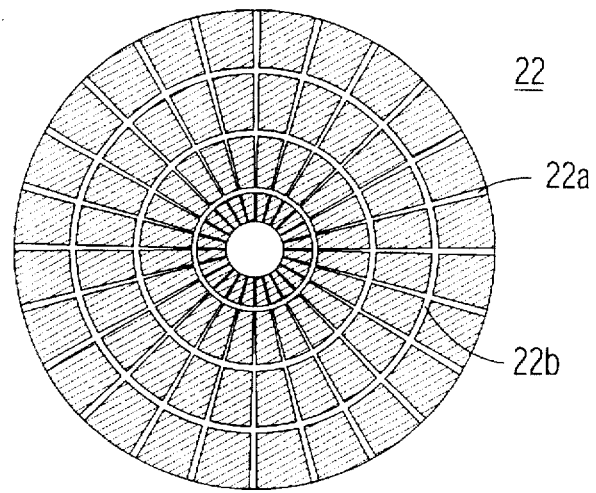

In the embodiment shown in FIG. 4 the low magnetic conductivity of the additional layer 22 is achieved by radial interruptions 22a and in the embodiment shown in FIG. 5 by additional concentric interruptions 22b.

Figure 6:
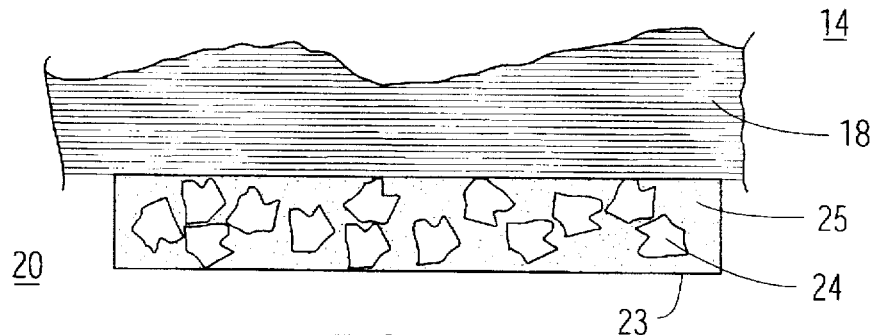

FIG. 6 shows a part of the rotor 14 with the electrically highly conductive layer 18 in a greatly enlarged radial cross-sectional view, the magnetically conductive additional layer 23 being formed by embedding granules 24 of a magnetically conductive material in a magnetically non-conductive matrix 25.

Figure 7:
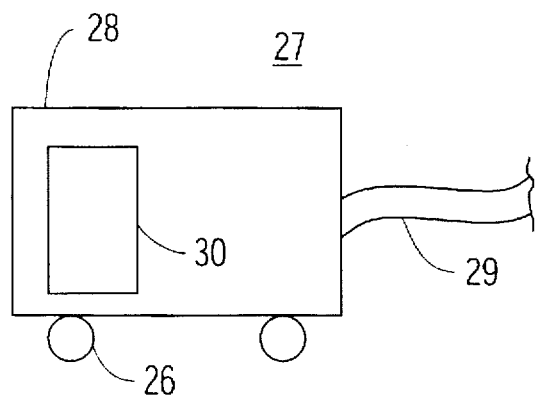
FIGS. 7 and 8 show diagrammatically two examples for the use of an axial-flow induction motor.

FIG. 7 shows diagrammatically a floor-type vacuum cleaner 27 supported on rollers 26, which vacuum cleaner has a housing 28 and a suction hose 29. The housing 28 accommodates the axial-flow induction motor 30 described above.

Figure 8:
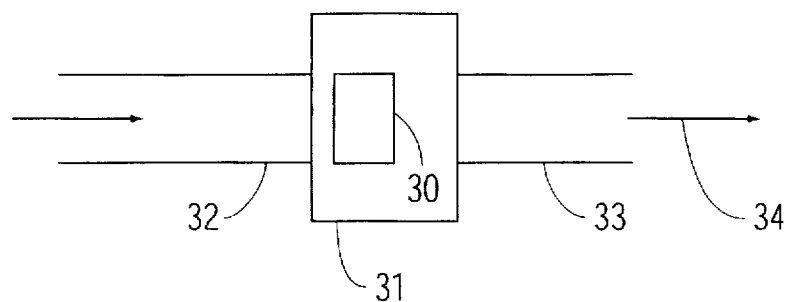

FIG. 8 shows diagrammatically a fan unit 31 with an axial-flow induction motor 30, with a gas inlet 32 and with a gas outlet 33 for the generation of gas streams 34.

It will thus be seen that the objects set forth above and those made apparent from the preceding description are efficiently attained, and since certain changes can be made in the above construction set forth without departing from the spirit and scope of the invention, it is intended that all matter contained in the above description and shown in the accompanying drawings shall be interpreted as illustrative and not in a limiting sense.

It is also to be understood that the following claims are intended to cover all the generic and specific features of the invention herein described and all statements of the scope of the invention, which as a matter of language, might be said to fall therebetween.

We claim:

1. An axial-flow induction motor having an alternating magnetic field and associated harmonics, comprising a stator having a winding arranged in a slot and a rotatably supported laminated rotor spaced from the stator by an air gap, the rotor including relative to the stator a remotely positioned magnetically conductive layer and a more closely positioned electrically conductive layer, characterized in that the rotor further includes an additional layer having magnetically conductive material therein whose magnetic conductivity in the direction of rotor rotation is low in comparison with the magnetic conductivity of the magnetically conductive layer wherein the thickness of the additional layer is substantially smaller than the electrically conductive layer and substantially smaller than the penetration depth of the harmonics.

2. The axial-flow induction motor as claimed in claim 1, characterized in that the additional layer is magnetically conductive throughout.

3. The axial-flow induction motor as claimed in claim 1, characterized in that the additional layer has radial interruptions in its magnetic conductivity.

4. The axial-flow induction motor as claimed in claim 1, characterized in that the additional layer has radial and concentric interruptions in its magnetic conductivity.

5. The axial-flow induction motor as claimed in claim 1, characterized in that the additional layer is formed by embedding granules or a magnetically conductive material in a magnetically non-conductive matrix.

6. The axial-flow induction motor as claimed in claim 1, characterized in that the additional layer is formed by electrodeposition.

7. The axial-flow induction motor as claimed in claim 1, characterized in that the additional layer is formed by printing with a magnetically conductive and electrically non-conductive ink.

8. The axial-flow induction motor as claimed in claim 1, characterized in that the magnetic conductivity of the additional layer in the rotational direction of the rotor corresponds to a relative permeability between 2 and 100.

9. The axial-flow induction motor as claimed in claim 1, characterized in that the additional layer has a thickness smaller than 500 μm.

10. A fan unit having a gas inlet, a gas outlet and comprising an induction motor according to claim 1.

11. A vacuum cleaner comprising a housing, a suction hose and an induction motor according to claim 1.

12. The axial-induction motor of claim 1, wherein the additional layer is positioned between the air gap and the electrically conductive layer.

* * * * *